Patented Nov. 7, 1950

2,529,449

UNITED STATES PATENT OFFICE 2,529,449

COMPOSITION COMPRISING POLYMERIZED ACRYLONITRILE AND SOLVENT THEREFOR

George E. Ham, Dayton, Ohio, assignor to Monsanto Chemical Company, St. Louis, Mo., a corporation of Delaware No Drawing. Application February 27, 1948, Serial No. 11,869

7 Claims. (Cl. 260—30.4)

1

This invention relates to a new method of preparing synthetic fibers from acrylonitrile polymers. More particularly the invention relates to new solvents which dissolve acrylonitrile polymers to form completely miscible mixtures.

Polyacrylonitrile and copolymers of monomeric mixtures containing at least 70 percent polymerizable content as are well known to be fiber forming materials. Such polymers, however, are frequently difficult to spin because of their slight solubility in most organic solvents. Conventional methods of preparing fibers from the acrylonitrile polymers involve the use of unusual and costly solvents, such as N, N-dimethyl formamide. Because of the cost of these unusual solvents and the difficulty of recovering them for re-use the cost of fabricating fibers from acrylonitrile copolymers is frequently prohibitive.

The principal purpose of this invention is to provide a more economical method of spinning fibers from acrylonitrile copolymers. A further purpose of this invention is to provide less expensive solvents for dissolving the polymers, which solvents are more readily recovered. A still further purpose is to provide a method of preparing polymer solutions from which high tenacity fibers may be spun with uniformly reproducible properties.

Suitable polymers useful in the preparation of fibers in accordance with this invention are polyacrylonitrile, and copolymers of acrylonitrile with one or more compatible monomer, such as vinyl acetate, vinyl chloride, vinyl propionate, acrylamide, methacrylamide, vinylidine chloride and styrene. Another class of copolymers useful in the practice of this invention are those described in copending application, Serial No. 786,153, filed November 14, 1947, by Reid G. Fordyce and George E. Ham, which are copolymers of 75 to 97 percent acrylonitrile, from 2 to 18 percent of methacrylonitrile and from one to 10 percent of vinyl acetate, and particularly the copolymers of 80 to 90 percent acrylonitrile, from 5 to 15 percent methacrylonitrile, and from 2 to 8 percent of vinyl acetate.

The new copolymers are prepared by emulsion polymerization in the presence of a peroxy catalyst and a suitable emulsifying agent for the purpose of maintaining the reagents intimately dispersed throughout the reaction. The emulsion polymerization is preferably conducted under such conditions that the copolymers formed are very uniform with respect to their chemical and physical characteristics. In copending application, Serial No. 5,482, filed January 30, 1948, by George E. Ham, there is described and claimed a method of preparing copolymers useful in the practice of this invention by emulsion polymerization, wherein the pre-mixed monomers in the desired proportions are added to the emulsion polymerization reaction at rates such that the reflux temperature is substantially constant.

In accordance with this invention it has been found that the acrylonitrile polymers and copolymers are readily dissolved in mixtures of 30 to 70 percent of dimethyl formamide and 30 to 70 percent of a cyclic ether, such as dioxane, morpholine, tetrahydropyran, 1,3-dioxolane, tetrahydrofuran, and trioxane. The useful cyclic ethers are those of the group consisting of five member rings and 6 member rings in which the member are selected from the group consisting of, —$CH_2$—, —$CHCH_3$—, —NH—, —CHCl—, —S—, and —O—, at least three of which members are hydrocarbon radicals.

In the practice of this invention as it is in the preparation of all acrylonitrile fibers, the molecular weight of the polymer is of critical importance. The polymer should have a molecular weight in excess of 10,000 and preferably in excess of 25,000. These molecular weights are determined by measuring the viscosity in suitable solvents in the manner well known to the art. It is also very desirable to use acrylonitrile polymers which are substantially uniform throughout especially with respect to composition and molecular weight. These uniform copolymers enable the practice of the invention more economically, permit the utilization of continuous uninterrupted spinning and greatly minimizes fiber friction and the clogging of the spinnerettes.

In the practice of this invention the polymers of acrylonitrile are used in finely divided form. Although massive polymers may be ground to desired size, preferably emulsion polymerization procedures such as those described above are employed. These emulsion techniques produce a polymer in subdivided state which may be used directly. The finely divided polymer is mixed with the miscible mixture of dimethyl formamide and cyclic ether in any type of mixing device, such as a dough mixer or Banbury mixer. Generally it is desirable to heat the mixture to a temperature close to the boiling point of the solvent to promote a more rapid dissolution. It is desirable to use a solution with a high concentration of polymer as possible, but the maximum concentration is dependent upon the molecular weight of the polymer. To obtain fibers of optimum physical properties polymers of molecular weights in excess of 25,000 are used and with such polymers it is only possible to dissolve from 5 to 20 percent in the dimethyl formamide and cyclic ether mixture without exceeding practicable viscosity values. Although as little as five percent of polymer can be used in the spin solution such low concentrations are undesirable because they necessitate the removal of too much solvent from the extruded solution, thereby increasing solvent recovery cost as well as reducing spinning speeds by lengthening the period required for coagulation. The concentration of polymer in the spinning solution is preferably between 10 and 20 percent, but will ultimately be determined by considering the desired physical properties of the fiber and speed of spinning, which is a function of the concentration and viscosity of the spinning solution. The viscosity will depend upon the chemical composition and molecular weight of the polymer. The optimum proportions can best be determined by selecting a uniform high molecular weight polymer having good fiber forming properties and dissolving it in as little solvent as is possible to form a viscous solution capable of being spun at convenient temperatures.

The fibers are spun by extruding the polymer solution through an orifice, or a spinnerette having a plurality of orifices, into a medium which removes the solvent. The volume of solution passed through the spinnerette must be constant in order to produce a fiber of uniform size. This is best achieved by using a positively driven gear pump adapted to deliver a constant flow of solution regardless of minor changes in viscosity and of the resistance offered by the spinnerette. It is also desirable to pass the solution which has been prefiltered through one or more filters before the spinnerette to remove the last traces of foreign matter and particles of incompletely dissolved polymer. The polymer may be delivered to the gear pump by pressure applied by an inert gas to make the solution fluid enough to pass through the conduits. The extruding operation should be operated at elevated temperatures but well below the boiling point of the solvent to facilitate the handling of the filament.

The medium into which the solution is extruded and which removes the solvent may be either liquid or gaseous. The method involving the use of the former, known as wet spinning, usually utilizes water, alcohol, salt solution or another liquid which is a solvent for the solvent but in which the polymer is insoluble. The solvent is leached out of the stream of polymer solution which becomes a viscous stream and finally a solid filament. When a spinnerette with a plurality of apertures is used the several streams of polymer converge to form a single strand. The spin bath must necessarily be of sufficient size to permit the complete or substantially complete removal of the solvent. Obviously the rapidity of extrusion will affect the size of the spin bath, high speeds requiring much longer baths. The temperature of the bath also affects the size, higher temperatures promoting more rapid diffusion of the solvent out of the fiber and permitting the use of shorter baths.

Frequently production speeds require longer baths than are industrially practicable, and under such conditions spinning into a gaseous medium is preferred. In the practice of this method air, steam, nitrogen or other gas, or mixture of gases, which are inert at the spin temperature are used as the medium. This method operates at higher temperatures and the solvent is evaporated from the surface of the fiber. The maximum temperature to which the fiber can be subjected is about the boiling point of the solvent, since evaporation within the fiber body causes formation of bubbles inside the fiber. The fiber may be heated by convection from the hot gaseous medium or by radiation from the walls of the confining vessel. Generally a combination of both convection and radiation is involved. The use of radiation heating is more efficient and permits operation with the wall temperature considerably in excess of the boiling point of the solvent. The evaporation of the solvent from the surface of the fiber and the speed of the fiber prevents the filament temperature from exceeding the boiling point of the solvent. The method of spinning into a gaseous medium, known as "dry spinning," is particularly adapted to high rates of extrusion.

In general the method of both wet and dry spinning which are commercially in use are readily adaptable to spinning from solvent solutions. Similarly conventional automatic machinery for spinning continuously, drying the thread if necessary, and winding it upon suitable spools can be used. As in the case of most synthetic fibers, the acrylonitrile polymer fibers spun from solvents must be stretched to develop optimum physical properties. If desired part of this stretching may be accomplished in the spin bath by drawing the fiber out of the bath at a rate more rapid than the rate of extrusion.

Although the invention may be practiced with any of the modifications described in the preceding specification it is obvious that other changes in modification may be made without departing from the nature and the spirit of the invention. The details set forth in the preceding specification are not to be construed as limitations upon the scope of the invention except to the extent set forth in the following claims.

I claim:

1. A solvent suitable for dissolution of a polymer of a monomeric mixture of which at least 70 percent of the polymerizable content is acrylonitrile, which comprises a miscible mixture of 30 to 70 percent of dimethylformamide and 70 to 30 percent of a cyclic ether of the group consisting of five member ring compounds and six member ring compounds, in which compounds the said members are selected from the group consisting of —$CH_2$—, —$CHCH_3$—, —NH—, —CHCl—, —S—, and —O—, at least three of said members being hydrocarbon radicals and at least one of the members being an oxygen atom.

2. A composition suitable for the preparation of fibers by extrusion which comprises a completely miscible mixture of a copolymer of 75 to 97 percent acrylonitrile, from 2 to 18 percent methacrylonitrile, and from one to 10 percent of vinyl acetate, said copolymer having a molecular weight of at least 10,000 and a solvent consisting of from 30 to 60 percent of dimethylformamide and from 40 to 70 percent of a cyclic ether of the group consisting of five member ring compounds and six member ring compounds, the members of which compounds are selected from the group consisting of —$CH_2$—, —$CHCH_3$—, —NH—, —CHCl—, —S—, and —O—, at least three of said members being hydrocarbon radicals and at least one of said members being an oxygen atom.

3. A composition suitable for the preparation of fibers by extrusion which comprises a completely miscible mixture of a copolymer of 80 to 90 percent acrylonitrile, from 5 to 15 percent methacrylonitrile, and from 2 to 8 percent of vinyl acetate, said copolymer having a molecular weight of at least 10,000 and a solvent consisting of from 30 to 60 percent of dimethylformamide and from 40 to 70 percent of a cyclic ether of the group consisting of five member ring compounds and six member ring compounds, the members of which compounds are selected from the group consisting of —$CH_2$—, —$CHCH_3$—, —NH—, —CHCl—, —S—, and —O—, at least three of said members being hydrocarbon radicals and at least one of said members being an oxygen atom.

4. A composition suitable for the preparation of fibers by extrusion which comprises a completely miscible mixture of a copolymer of 80 to 90 percent acrylonitrile, from 5 to 15 percent methacrylonitrile, and from 2 to 8 percent of vinyl acetate, said copolymer having a molecular weight of at least 10,000 and a solvent consisting of from 30 to 60 percent of dimethylformamide and from 40 to 70 percent of dioxane.

5. A composition suitable for the preparation of fibers by extrusion which comprises a completely miscible mixture of a copolymer of 80 to 90 percent acrylonitrile, from 5 to 15 percent methacrylonitrile, and from 2 to 8 percent of vinyl acetate, said copolymer having a molecular weight of at least 10,000 and a solvent consisting of from 30 to 60 percent of dimethylformamide and from 40 to 70 percent of morpholine.

6. A composition suitable for the preparation of fibers by extrusion which comprises a completely miscible mixture of a copolymer of 80 to 90 percent acrylonitrile, from 5 to 15 percent methacrylonitrile, and from 2 to 8 percent of vinyl acetate, said copolymer having a molecular weight of at least 10,000 and a solvent consisting of from 30 to 60 percent of dimethylformamide and from 40 to 70 percent of 1,3-dioxolane.

7. A composition suitable for the preparation of fibers by extrusion, which comprises a completely miscible mixture of from 5 to 20 percent by weight of a polymer of at least 70 percent of acrylonitrile and up to 30 percent of another compatible olefinic monomer and from 80 to 95 percent of a solvent consisting of 30 to 70 percent by weight of dimethyl formamide and 70 to 30 percent of a cyclic ether of the group consisting of five member ring compounds and six member ring compounds, in which compounds the said members are selected from the group of radicals consisting of —$CH_2$—, —$CHCH_3$—, —NH—, —CHCl—, —S—, and —O—, at least three of said members being hydrocarbon radicals and at least one member being an oxygen atom.

GEORGE E. HAM.

REFERENCES CITED

The following references are of record in the file of this patent:

UNITED STATES PATENTS

| Number | Name | Date |
|---|---|---|
| 2,404,714 | Latham | July 23, 1946 |